(12) United States Patent
Henzler et al.

(10) Patent No.: US 9,529,765 B2
(45) Date of Patent: Dec. 27, 2016

(54) INTEGRATED CIRCUIT (IC) WITH RECONFIGURABLE DIGITAL VOLTAGE REGULATOR FABRIC

(71) Applicants: Stephan Henzler, Munich (DE); David Herbison, Munich (DE)

(72) Inventors: Stephan Henzler, Munich (DE); David Herbison, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 266 days.

(21) Appl. No.: 14/313,817

(22) Filed: Jun. 24, 2014

(65) Prior Publication Data

US 2015/0370298 A1    Dec. 24, 2015

(51) Int. Cl.
*G06F 1/26* (2006.01)
*G06F 13/42* (2006.01)

(52) U.S. Cl.
CPC ............. *G06F 13/4221* (2013.01); *G06F 1/26* (2013.01)

(58) Field of Classification Search
CPC .................................. G06F 1/26; G06F 1/266
USPC ................................................... 713/300, 320
See application file for complete search history.

(56) References Cited

U.S. PATENT DOCUMENTS

| | | | |
|---|---|---|---|
| 7,906,947 B2* | 3/2011 | Carlson ..................... | G06F 1/26 323/272 |
| 2008/0111534 A1* | 5/2008 | Ravichandran ........... | G06F 1/26 323/351 |
| 2009/0158071 A1* | 6/2009 | Ooi ........................ | G06F 11/30 713/340 |
| 2011/0022859 A1* | 1/2011 | More .................... | G06F 1/3203 713/300 |
| 2015/0310331 A1* | 10/2015 | Rolston ................. | G06N 5/025 700/298 |

\* cited by examiner

*Primary Examiner* — Chun Cao
(74) *Attorney, Agent, or Firm* — Blakely, Sokoloff, Taylor & Zafman LLP

(57) ABSTRACT

Described is an apparatus which comprises: a plurality of bridges which are operable to drive respective signals for one or more power supply rails; a plurality of controllers; and a main controller to couple one or more controllers from the plurality of controllers to one or more bridges from the plurality of bridges.

19 Claims, 7 Drawing Sheets

INTEGRATED CIRCUIT (IC) WITH RECONFIGURABLE DIGITAL VOLTAGE REGULATOR FABRIC

BACKGROUND

Designing Power Management Integrated Circuits (PMICs) is tedious and time consuming. For example, different customers of PMICs request different current drive capabilities and regulated power supply voltage levels. For System-on-chips (SoCs), there are many logic units operating on different power supply levels (e.g., 3.3V to 0.7V). During SoC development, maximum current delivery requirements may change that may require a significant redesign of the PMIC. Generally, PMICs are designed in parallel to the design of platforms (and/or SoCs), and reacting to late changes in power supply requirements on the platforms (and/or SoCs) slows down the completion of PMIC designs and thus the overall time to market of the platform.

PMICs also provide power to other chips (other than SoCs) on a motherboard. With many different platforms in the market, there is a wide variety of power supply requirements which today are supported by customized PMIC solutions. These customized PMICs may not meet the specifications for other platforms and processors that the PMICs are not designed for.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
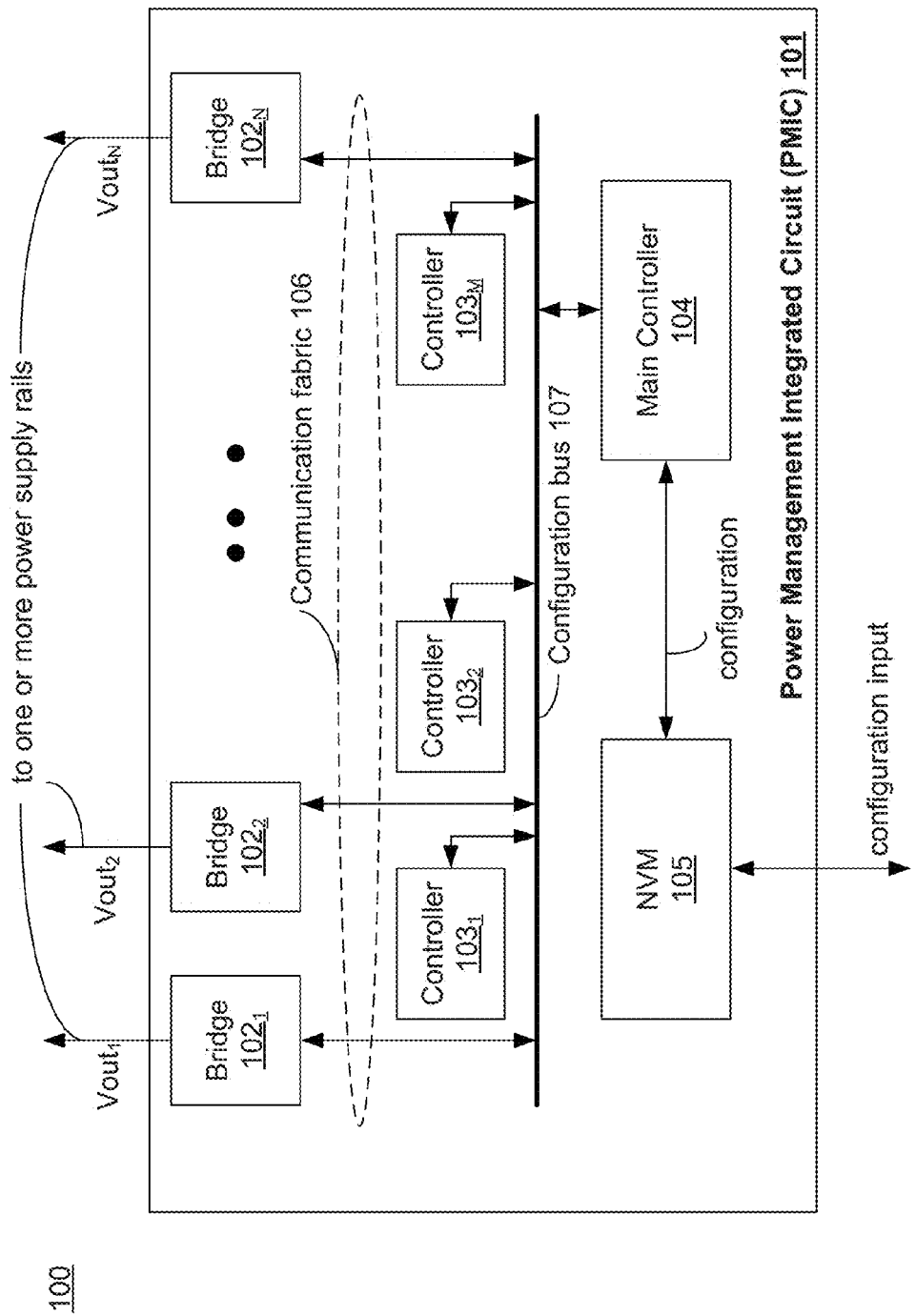
FIG. 1 illustrates an Integrated Circuit (IC) with reconfigurable power supply regulators managed by a main controller, according to one embodiment of the disclosure.

Some embodiments describe a reconfigurable PMIC that is operable to assign one or more bridges from a plurality of bridges to one or more controllers from a plurality of controllers according to the load specifications of the platform. Here, loads are components of the platform that receive regulated power supplies from the reconfigurable PMIC. In one embodiment, the bridges are not exclusively connected to controllers, but a software or main controller can communicatively attach each bridge to a particular controller. In one embodiment, a communication fabric is provided so that each bridge can communicate with each controller so that the bridges and controllers can pair up according to instructions from the main controller or software. In one embodiment, the communication fabric uses asynchronous communication protocols while each controller and/or bridge may use a synchronous protocol within their boundaries.

There are many technical effects of the embodiments. For example, the PMIC described here can support (i.e., meet power specifications of) many kinds of SoCs and platforms without having to develop/design/fabricate separate PMICs for different SoCs and platforms. This reduces the development and mask costs for the PMIC. The PMIC described here can be made available as part of an Intellectual Property (IP) block. The IP block can then be configured for any platform or SoC to meet their power supply requirements.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates an Integrated Circuit (IC) 100 with reconfigurable power supply regulators managed by a main controller, according to one embodiment of the disclosure. In one embodiment, IC 100 comprises a plurality of Bridges $102_{1-N}$ (where 'N' is an integer greater than one), a plurality of Controllers $103_{1-M}$ (where 'M' is an integer greater than one), a Main Controller 104, a non-volatile memory (NVM) 105, a Communication fabric 106, and Configuration bus 107. Here, the terms "Phase" and "Bridge" are interchangeably used and refer generally to the driver and associated logic providing the output power supply Vout. Here, the terms "Voltage Regulator" (VR) and "Controller" are also interchangeably used and generally refer to the section of the regulator and includes registers, compensation units, analog-to-digital converters (ADCs), etc which control the behavior of one or more bridges.

In one embodiment, each Bridge (i.e., each of $102_{1-N}$) provides a respective output voltage $Vout_{1-N}$ as shown for one or more power supply rails. The output of each Bridge is normally not the output voltage. There is a passive network to translate the full swing pulse width modulated output signal of the one or more Bridges into the output voltage Vout. The passive network is normally an L-C (inductor-capacitor) filter. When the inductor and the capacitor are integrated in PMIC 101, the output of the one or more Bridges is equal to the rail voltage. In one embodiment, the passive network is off-die i.e., outside of PMIC 101. In such an embodiment, the output from the rail node is fed back into the Controller (e.g., one or more of Controllers $103_{1-M}$) to regulate the output of the one or more Bridges.

In one embodiment, $Vout_1$ and $Vout_2$ may be coupled to a first power supply rail and $Vout_N$ may be coupled to another power supply rail separate from the first power supply rail. In one embodiment, each Bridge comprises a digital pulse width modulator (PWM), digital current control logic, autonomous asynchronous control for pulse frequency modulation (PFM) and hysteretic control, and/or power stage (e.g., like output stage of a low dropout regulator, or high-side and low-side switches of a buck/boost converter, etc.). In one embodiment, each Bridge is a DC-DC converter. In one embodiment, the frequency and/or duty cycle of the pulse width modulation signal generated by the PWM is controllably by one or more Controllers (i.e., one or more of $103_{1-M}$) and/or Main Controller 104.

In one embodiment, each Controller (i.e., one of more of $103_{1-M}$) comprises a digital control loop, and compensators. The digital control loop may monitor the output (i.e., one or more of $Vout_{1-N}$) and adjust the characteristics of one or more Bridges (i.e., one or more of $102_{1-N}$) to regulate the output voltages (i.e., one or more of $Vout_{1-N}$). In one embodiment, a set of ADCs are used to measure the output voltage (i.e., one or more of $Vout_{1-N}$) and provide a digital representation to the one or more Controllers $103_{1-M}$. The ADCs can be part of the Bridges $102_{1-N}$, Controllers $103_{1-M}$, or separate units in PMIC 101.

In one embodiment, Main Controller 104 configures PMIC 101 for a particular platform or SoC according to configuration information. In one embodiment, the configuration information is directly provided or loaded into Main Controller 104 from an operating system, fuses, or an input-output (I/O) interface (not shown). In one embodiment, the configuration information is received from NVM 105. In one embodiment, configuration input is received by an external source (e.g., by an operating system, designer, another processor, etc.) and saved in NVM 105. In one embodiment, upon an event (e.g., power-up of PMIC 101), configuration information from NVM 105 is read by Main Controller 104 and then passed on via Configuration bus 107 to Bridges $102_{1-N}$ and Controllers $103_{1-M}$.

In one embodiment, NVM 105 is a read only ROM (Random access memory) or programmable ROM e.g., fuses. NVM 105 can be implemented using any known technology. For example, NAND flash, NOR flash, MRAM (magnetic random access memory such as resistive memories), etc. While the embodiments show NVM 105 as part of PMIC 101, NVM 105 can be positioned outside of PMIC 101. In such an embodiment, configuration is read from NVM 105 by Main Controller 104 using an I/O interface. In another embodiment, NVM 105 may store information about several configurations, e.g., the configuration information for several platforms. In one embodiment, PMIC 101 further comprises an input signal which can be used to select one of the multiple configuration information.

In one embodiment, Main Controller 104 configures Controller $103_{1-M}$ and Bridges $102_{1-N}$ before powering up the power rails coupled to the outputs of Bridges $102_{1-N}$. For example, Main Controller 104 pairs one or more Bridges $102_{1-N}$ to one or more Controllers $103_{1-M}$ according to the power supply requirements when PMIC 101 is powered up. In one embodiment, instead of a dedicated NVM 105, multiple platform configurations are stored in an NVM or fuses and then selected by Main Controller 104 using a platform select bit. In one embodiment, configuration information stored in NVM 105 includes power configuration settings for different platforms (and/or SoCs).

For example, configuration information includes switching frequency information (e.g., 1-10 MHz) of Bridges $102_{1-N}$, duty cycle information (e.g., 40-60%) of pulse width modulation signals, criteria for switching from pulse width modulation to pulse frequency modulation, pairing information of Bridges $102_{1-N}$ to Controllers $103_{1-M}$, compensation filter characteristics (e.g., how fast/slow to react to changing load conditions on the power supply rails coupled to the Bridges), multi-phase configuration of Bridges $102_{1-N}$, load current sensing thresholds, current thresholds for activation/deactivation of some of the Bridges connected to a particular power rail, control mode (i.e., current mode, voltage mode, hysteretic mode, etc.) output voltage setting, and voltage scaling limits, etc.

In one embodiment, Main Controller 104 sets the configuration of PMIC 101 using information passed on Configuration bus 107. In one embodiment, Configuration bus 107 is used for programming the registers inside Controllers $103_{1-M}$ and Bridges $102_{1-N}$. In one embodiment, Controllers $103_{1-M}$ communicate with Bridges $102_{1-N}$ via Communication fabric 106. One reason for having Communication fabric 106 different from Configuration bus 107 (also referred here as the register bus) is that Controllers $103_{1-M}$ need to exchange data in parallel.

In one embodiment, Communication fabric 106 is a bus or plurality of busses that operates using an asynchronous protocol. Examples of asynchronous protocol include exchanging of data by means of toggle signals, handshakes, etc. One reason for using an asynchronous protocol is to avoid distributing clock signals for the entire PMIC 101, which is generally one of the larger ICs on the platform. In one embodiment, Communication fabric 106 is implemented as cross-bar (X-bar) wires. In other embodiments, other types of networks may be used to implement Communication fabric 106.

In one embodiment, Configuration bus 107 is used to configure PMIC 101. For example, information provided on Configuration bus 107 sets register values in Bridges $102_{1-N}$ and Controller $103_{1-M}$ respectively so that Bridges $102_{1-N}$ know which Controller (from among Controllers $103_{1-M}$) is it paired with, and visa versa, and how the Bridge should operate. In one embodiment, this information provided to the registers is latched using a clock signal associated with the corresponding Bridge and Controller.

In one embodiment, Communication fabric 106 provides with infrastructure to exchange data between Controllers $103_{1-M}$ and Bridges $102_{1-N}$. In one embodiment, Communication fabric 106 carries control information from Controllers $103_{1-M}$ to bridges $102_{1-N}$ and status and measurement information is brought back from Bridges $102_{1-N}$ to Controllers $102_{1-N}$ via Communication fabric 106. In one embodiment, this data exchange happens during active operation of PMIC 101. In one embodiment, data exchange between separate Controllers $103_{1-M}$ and Bridges $102_{1-N}$ happens in parallel. In one embodiment, Configuration bus 107 provides information to Controllers $103_{1-M}$ and Bridges $102_{1-N}$ for configuring PMIC 101, for example, before starting the regulation operation. In one embodiment, Main Controller 104 may also reconfigure Communication fabric 106 for the desired combination of Controllers and Bridges. In such an embodiment, the communication between Main Controller 104 and Controllers $103_{1-M}$ and/or Bridges $102_{1-N}$ occurs using Configuration bus 107.

Figure 2:
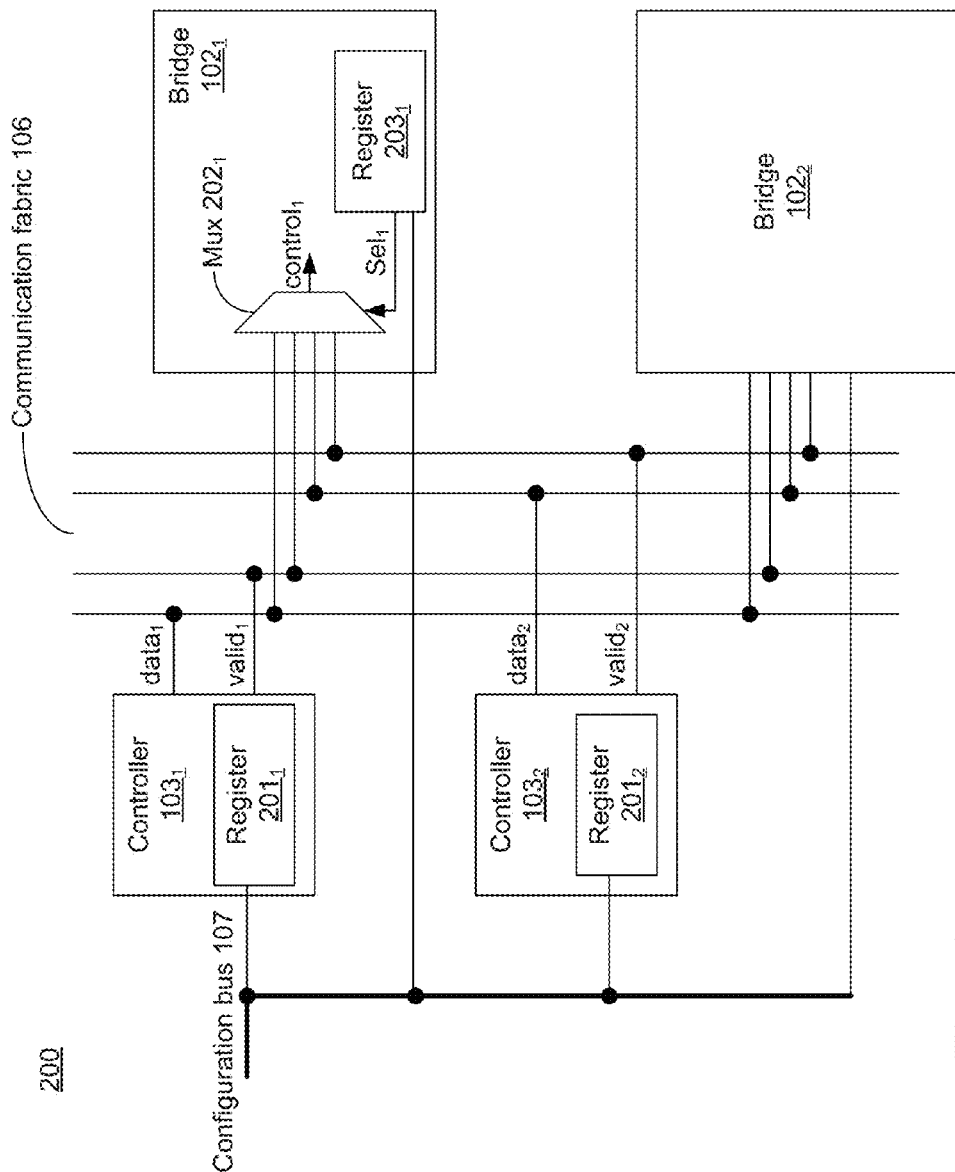
FIG. 2 illustrates a portion of the IC with reconfigurable power supply regulators having asynchronous communication fabric, according to one embodiment of the disclosure.

FIG. 2 illustrates a portion 200 of IC 101 with reconfigurable power supply regulators having asynchronous communication fabric, according to one embodiment of the disclosure. It is pointed out that those elements of FIG. 2 having the same reference numbers (or names) as the elements of any other figure can operate or function in any manner similar to that described, but are not limited to such.

Portion 200 illustrates two Bridges $102_{1-2}$, two Controllers $103_{1-2}$, and a portion of Communication fabric 106. In portion 200, two Controllers and Bridges are shown so as not to obscure the embodiments. However, the embodiments are applicable to any number of Controllers and Bridges. In one embodiment, each Controller includes a respective register. For example, Controller $103_1$ includes Register $201_1$, and Controller $103_2$ includes Register $201_2$. In one embodiment, each Bridge includes a respective register. For example, Bridge $102_1$ includes Register $203_1$, and Bridge $102_2$ includes Register $203_2$ (not shown). In one embodiment, Registers $201_{1-2}$ and $203_{1-2}$ are implemented as a Register File (RF), static random access memory (SRAM), a chain of flip-flops (FFs) or latches, etc.

In one embodiment, each Bridge includes a selection unit (e.g., a multiplexer (Mux)) to select a configuration for operating the Bridge. For example, Bridge $102_1$ includes Mux $202_1$ that receives inputs from the Controllers and selects one of those inputs according to an output $Sel_1$ signal from Register $203_1$. In one embodiment, logic level of $Sel_1$ signal is set according to the values saved in Register $203_1$, which depends on the values saved in NVM 105 and read by Main Controller 104.

In one embodiment, each Bridge samples respective config signals (i.e., outputs of their respective multiplexers) independently. In one embodiment, whenever Main Controller 104 provides new configuration and/or control information on Communication bus 107, that information is made available to the Bridges and Controllers. In one embodiment, some or all of that information is stored in respective registers of Bridges $102_{1-N}$ and Controllers $103_{1-M}$.

In one embodiment, Bridges and Controllers update their configuration information according to the new updates received over Configuration bus 107. For example, Main Controller 104 determines a change in loading conditions on the one or more power rails coupled to Bridges $102_{1-2}$, and sends new configuration information to Controllers $103_{1-2}$ and Bridges $102_{1-2}$ to adjust their switching frequencies. In one embodiment, if a Bridge is not attached to any Controller, then the Bridge may operate independently/autonomously in an asynchronous mode.

Figure 3:
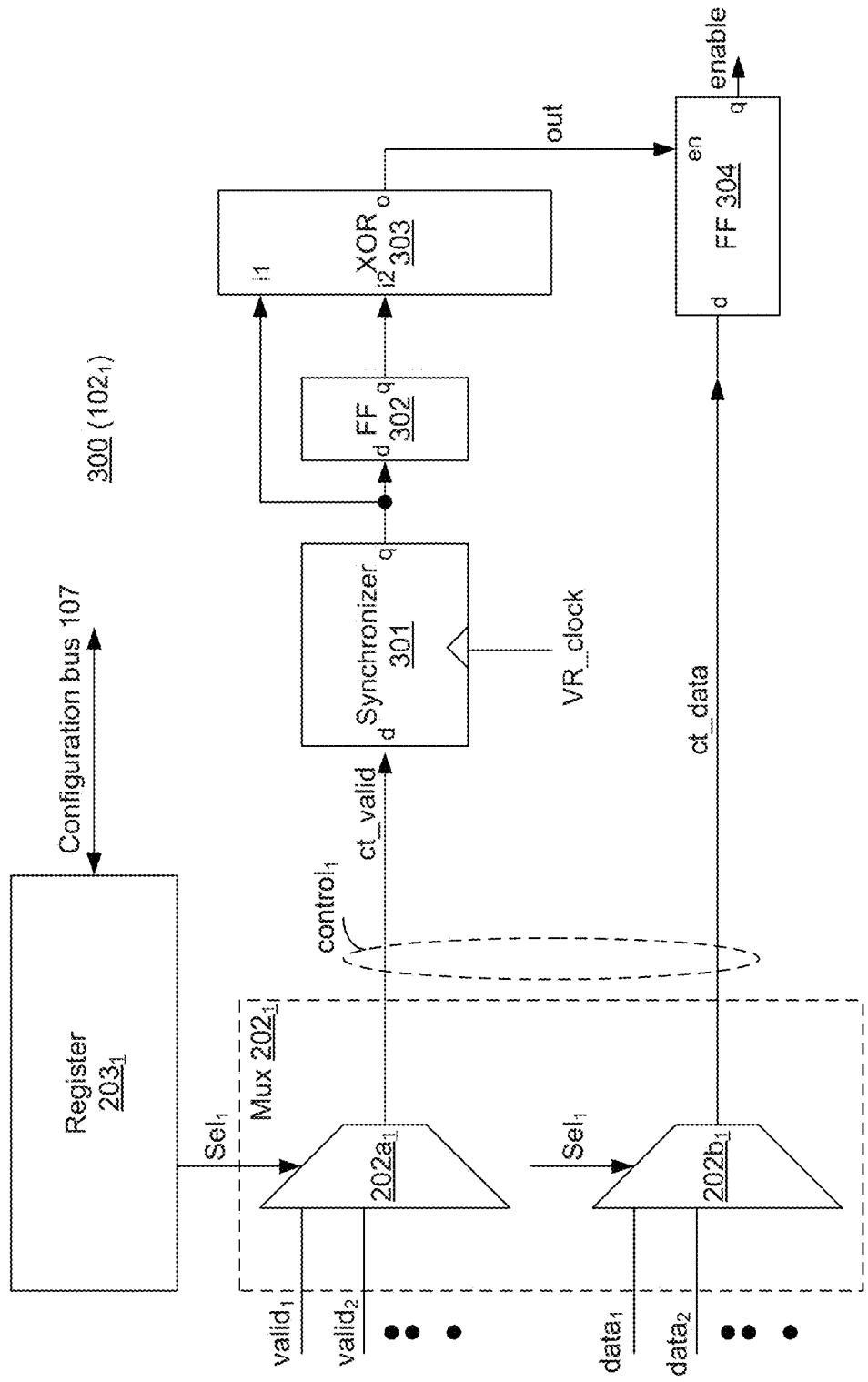
FIG. 3 illustrates logic for selecting and synchronizing steering information from the controllers, according to one embodiment of the disclosure.

FIG. 3 illustrates logic 300 (e.g., part of Bridge $102_1$) for selecting and synchronizing information from Controllers $103_{1-M}$, according to one embodiment of the disclosure. It is pointed out that those elements of FIG. 3 having the same reference numbers (or names) as the elements of any other figure can operate or function in any manner similar to that described, but are not limited to such.

In one embodiment, logic 300 comprises Synchronizer 301, flip-flop (FF) 302, Exclusive-OR (XOR) 303, and FF 304 coupled together as shown. While the embodiment illustrates FF as sequential units, other types of sequential units may be used. Likewise, XOR 303 may be replaced with another type of comparing unit.

In one embodiment, Mux $202_1$ is implemented as Mux $202a_1$ and Mux $202b_1$ that together provide $control_1$, where Mux $202a_1$ selects one of the valid signals ($valid_{1-N}$, where 'N' is an integer greater than one) and provides it as ct_valid for Synchronizer 301, and where Mux $202b_1$ selects one of the data signals ($data_{1-N}$) and provides it as ct_data for sampling by FF 304 to generate a final enabling signal. In one embodiment, once ct_valid signal is synchronized using a local clock (e.g., VR_clock), then output of Synchronizer is sampled by FF 302. In one embodiment, XOR 303 compares the input of FF 302 with the output of FF 302 to ascertain whether FF 304 should be enabled or not.

In one embodiment, logic 300 is used to read the control information (i.e., $valid_{1-N}$, $data_{1-N}$) which is intended for a particular bridge (i.e., Bridge $102_1$ in this example). Assume for purposes of explanation that there are three controllers. In such an example, each of the controllers broadcasts, for instance, duty cycle information (as $data_{1-3}$ from Controllers $103_{1-3}$). In one embodiment, this broadcast occurs at least once per switching cycle of the bridge. In one embodiment, the duty cycle information from the Controller which is attached to the Bridge is evaluated. In such an embodiment, multiplexer $202_1$ is used to choose one of the multiple control, e.g., duty cycle information for Bridge $102_1$. In one embodiment, the valid signal is part of the asynchronous communication protocol. In one embodiment, information about each duty cycle comes with a control signal that indicates when it has changed and can be considered valid.

Figure 4:
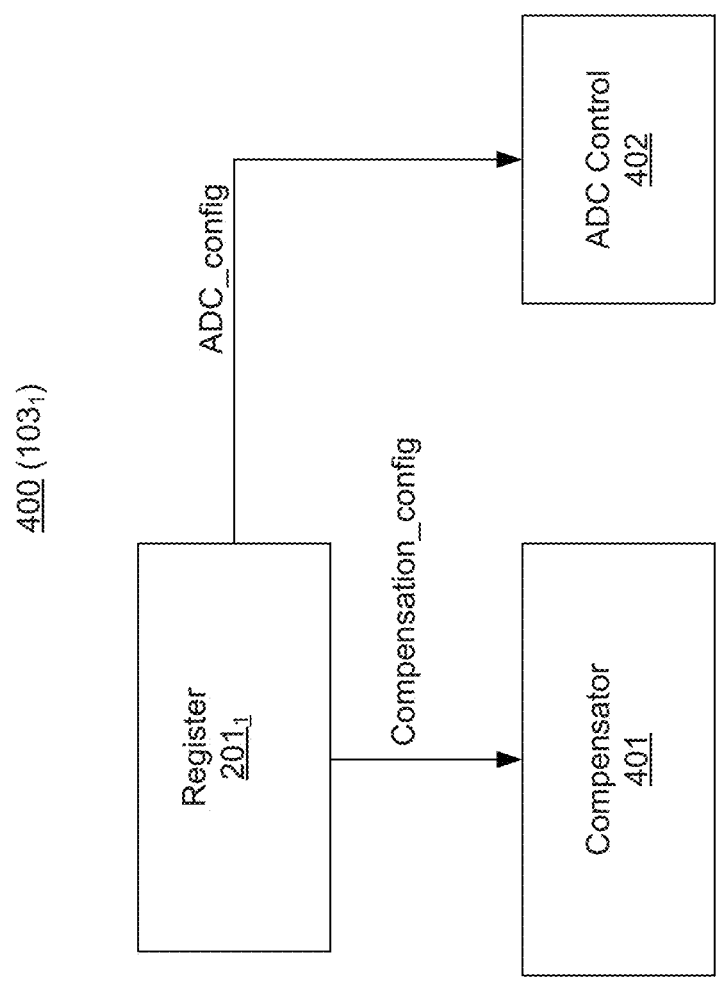
FIG. 4 illustrates part of a reconfigurable controller in the IC, according to one embodiment of the disclosure.

FIG. 4 illustrates part of a reconfigurable controller 400 (e.g., part of Controller $103_1$) of IC 101, according to one embodiment of the disclosure. It is pointed out that those elements of FIG. 4 having the same reference numbers (or names) as the elements of any other figure can operate or function in any manner similar to that described, but are not limited to such.

In one embodiment, portion of reconfigurable controller 400 comprises Compensator 401 and ADC Controller 402 coupled together as shown. In one embodiment, Compensator 401 receives its configuration information Compensation_config from Register $201_1$. In one embodiment, ADC Control 402 receives its configuration information ADC_conFIG. In one embodiment, depending on the number and type of Bridges that are enabled, the number of ADC samples per switching period may vary. Here, ADC_config defines that number of ADC samples per switching period. In one embodiment, depending on the number and type of Bridges that are enabled, filter characteristics of Compensator 401 may vary. Here, Compensation_config defines those filter characteristics.

Figure 5:
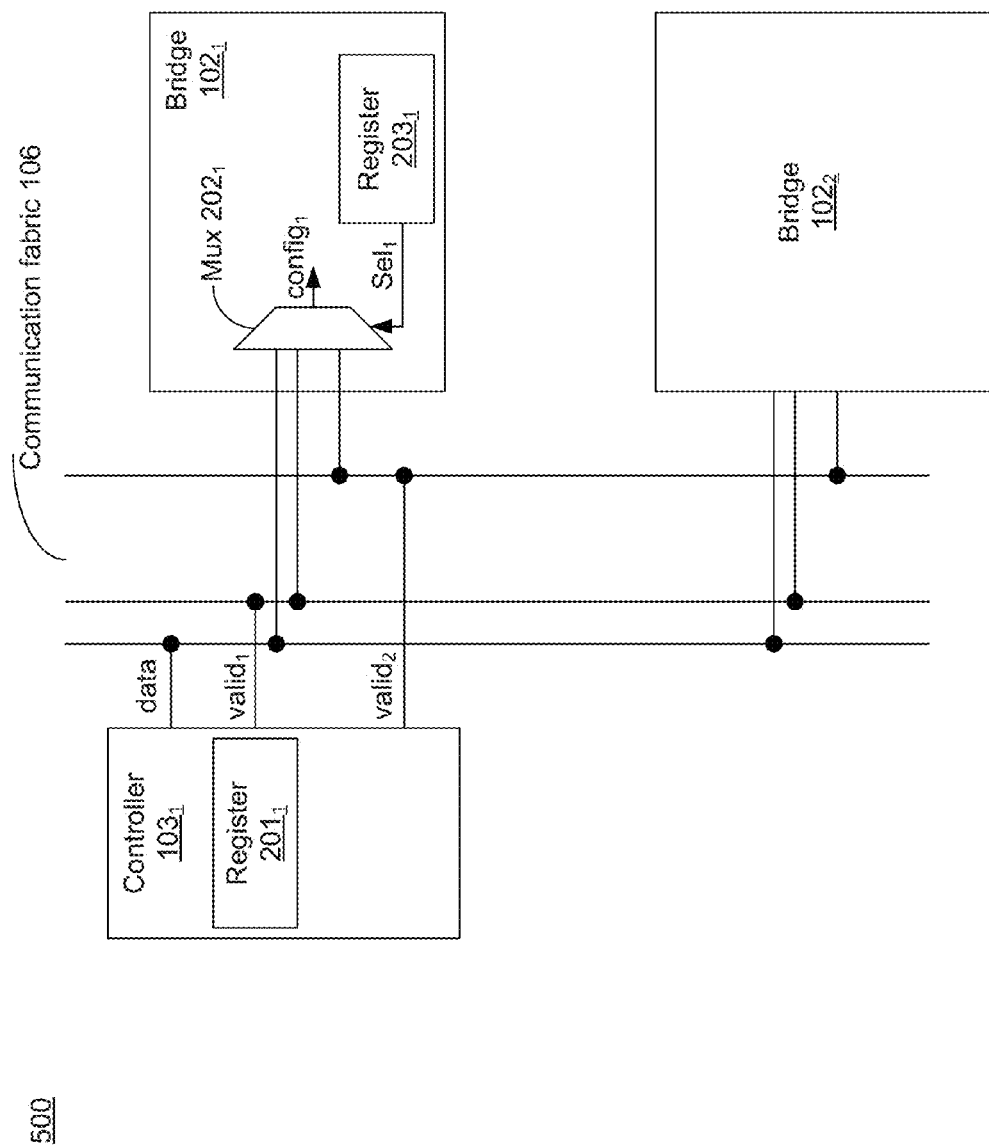
FIG. 5 illustrates a portion of the IC configured to drive multiple phases using a single controller, according to one embodiment of the disclosure.

FIG. 5 illustrates a portion 500 of IC 101 configured to drive multiple phases using a single controller, according to one embodiment of the disclosure. It is pointed out that those elements of FIG. 5 having the same reference numbers (or names) as the elements of any other figure can operate or function in any manner similar to that described, but are not limited to such.

So as not to obscure the embodiments of this disclosure, differences between FIG. 2 and FIG. 5 are described. Compared to FIG. 2, in this embodiment, Controller $103_1$ provides control data (via Communication fabric 106) to at least two Bridges $102_{1-2}$. In one embodiment, more than one Bridge can be connected to a single. In one embodiment, different Bridges provide regulated voltage to different power rails.

In one embodiment, Controller $103_1$ provides two phases in a time multiplexed manner to Bridges $102_{1-2}$. In this embodiment, Mux $202_1$ receives data and valid signals and selects $control_1$ as described with reference to FIG. 3. Referring back to FIG. 5, while the embodiment is disclosed with reference to two Bridges $102_{1-2}$, more than two Bridges can be controlled by a single Controller. One such usage model for a single Controller controlling multiple Bridges using time multiplexed phase shifting is when other Controllers are not available for controlling other bridges.

Figure 6A:
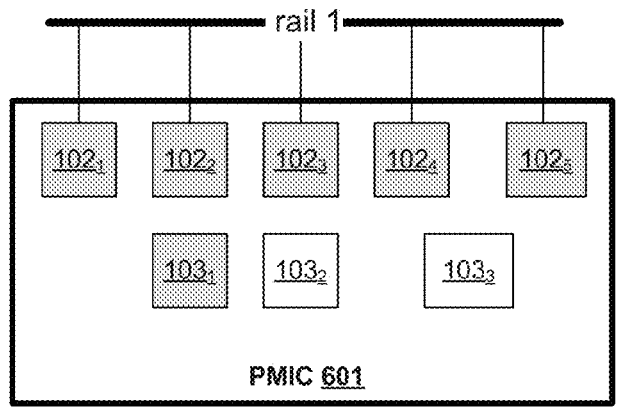
FIGS. 6A-C illustrate usage models of the IC, according to one embodiment of the disclosure.
Figure 6B:
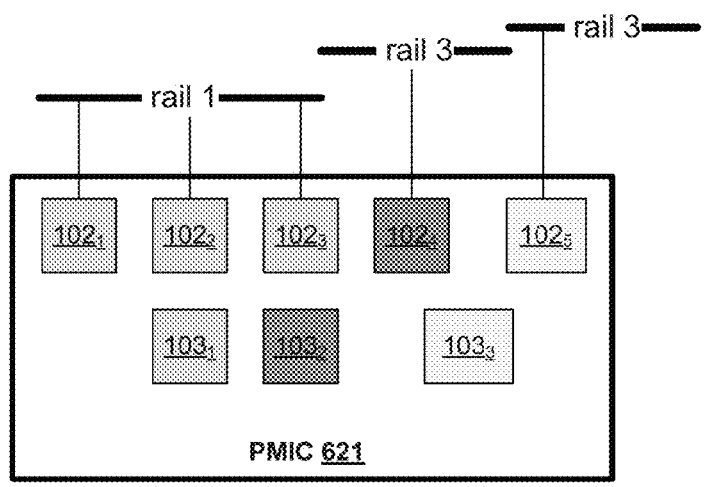
Figure 6C:
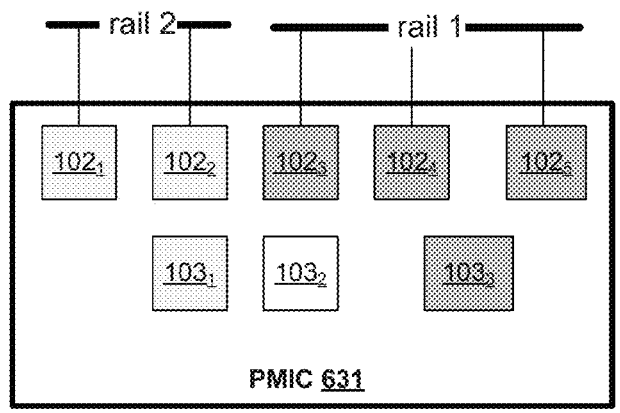

FIGS. 6A-C illustrate usage models 600, 620, and 630 of IC 101, according to one embodiment of the disclosure. It is pointed out that those elements of FIGS. 6A-C having the same reference numbers (or names) as the elements of any other figure can operate or function in any manner similar to that described, but are not limited to such.

So as not to obscure the embodiments, PMIC 601, 621, and 631 are shown with five Bridges and three Controllers. However, any number of Bridges and Controllers may be used. In usage model 600, Controller $103_1$ controls the five Bridges $102_{1-5}$. In this embodiment, all the five Bridges drive power rail 1. In one embodiment, Controller $103_1$ time multiplexes the phases driven by Bridges $102_{1-5}$. In this embodiment, the other three Controllers $103_{2-3}$ are turned off.

In usage model 620, Controller $103_1$ controls Bridges $102_{1-3}$, Controller $103_2$ controls Bridge $102_4$, and Controller $103_3$ controls Bridge $102_5$. In this embodiment, Bridges $102_{1-3}$ drive power rail 1, Bridge $102_4$ drives power rail 2, and Bridge $102_5$ drives power rail 3. Here, each power rail have their own power supply requirements and hence different number and configurations for Bridges are used to provide regulated voltages to the three different rails. In one embodiment, Controller $103_1$ time multiplexes the phases driven by Bridges $102_{1-3}$.

In usage model 630, Controller $103_1$ controls Bridges $102_{1-2}$, Controller $103_2$ is OFF, and Controller $103_3$ controls Bridges $102_{3-5}$. In this embodiment, Bridges $102_{3-5}$ drive power rail 1, and Bridges $102_{1-2}$ drives power rail 2. Here, each power rail may have their own power supply requirements and hence different number and configurations for Bridges are used to provide regulated voltages to the two different rails.

Figure 7:
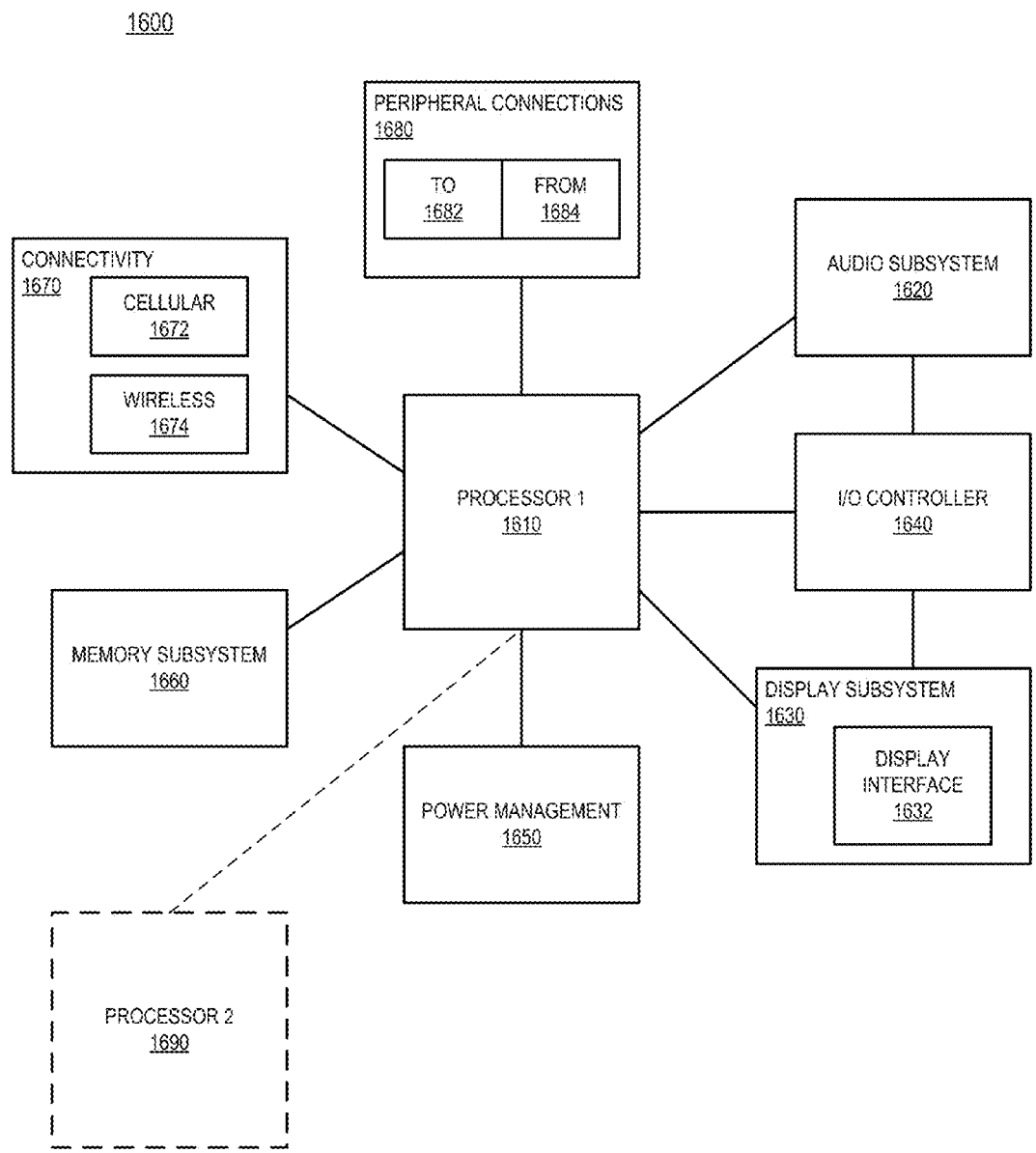
FIG. 7 is a smart device or a computer system or a SoC (System-on-Chip) having the IC with reconfigurable power supply regulators managed by a main controller, according to one embodiment.

FIG. 7 is a smart device or a computer system or a SoC (System-on-Chip) having the IC with reconfigurable power supply regulators managed by a main controller, according to one embodiment. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with IC 101 with reconfigurable power supply regulators managed by a main controller. Other blocks of the computing device 1600 may also include IC 101 with reconfigurable power supply regulators managed by a main controller. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. Processor 1690 may be optional. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an integrated circuit is provided which comprises: a plurality of bridges which are operable to drive respective signals for one or more power supply rails; a plurality of controllers; and a main controller to couple one or more controllers from the plurality of controllers to one or more bridges from the plurality of bridges. In one embodiment, the integrated circuit further comprises a plurality of ADCs for converting voltage levels on the one or more power supply rails to their respective digital representations.

In one embodiment, the plurality of ADCs is coupled to the plurality of controllers. In one embodiment, each of the plurality of controllers includes a digital compensator to close a control loop formed by the one or more bridges, external passive components, one of the ADCs of the plurality of ADCs, and one of the controllers of the plurality of controllers. In one embodiment, each of the plurality of controllers includes a register. In one embodiment, each of the plurality of bridges includes a register.

In one embodiment, the integrated circuit further comprises a NVM coupled to the main controller, wherein the NVM stores a plurality of configurations for coupling the plurality of bridges with the plurality of controllers. In one embodiment, the plurality of configurations includes one or more of: switching frequency for each of the plurality of bridges; compensation filter characteristics for each of the plurality of controllers; or coupling information for each controller and each bridge of the plurality of controllers and bridges. In one embodiment, the NVM is operable to update the plurality of configurations at power-up. In one embodiment, the main controller is operable to copy some of the configuration information from the NVM to the respective registers of the plurality of bridges and the plurality of controllers.

In one embodiment, the main controller is coupled to the plurality of controllers and the plurality of bridges by a configuration bus. In one embodiment, each controller of the plurality of controllers and each bridge of the plurality of bridges is coupled by a communication fabric. In one embodiment, the communication fabric is one of: an asynchronous bus, a crossbar, a network of wires, or dedicated connections with multiplexers. In one embodiment, each controller of the plurality of controller operates using a clock signal. In one embodiment, the main controller is operable to configure a single controller from the plurality of controllers to operate with more than two bridges of the plurality of bridges.

In another example, a system is provided which comprises: one or more power supply rails; one or more logic units coupled to the one or more power supply rails, the one or more power supply rails to provide power supply to the one or more logic units; and a PMIC coupled to the one or more power supply rails, wherein the PMIC is according to the integrated circuit described above. In one embodiment, the system further comprises a wireless interface for allowing the system to communicate with another device. In one embodiment, the system further comprises a memory unit.

In another example, an integrated circuit is provided which comprises: a main controller; a register bus coupled to the main controller; a plurality of bridges each having a register to receive configuration information from the register bus; and a plurality of controllers each having a register to receive the configuration information from the register bus. In one embodiment, the integrated circuit further comprises an asynchronous bus coupled to the plurality of bridges and the plurality of controllers.

In one embodiment, the main controller is operable to provide the configuration information over the register bus for the plurality of bridges and controllers. In one embodiment, the integrated circuit further comprises a plurality of ADCs for converting voltage levels on the one or more power supply rails to their respective digital representations. In one embodiment, the integrated circuit further comprises a non-volatile memory (NVM) coupled to the main controller, the NVM to store a plurality of configurations for coupling the plurality of bridges with the plurality of controllers.

In another example, a method is provided which comprises: driving by a plurality of bridges respective signals for one or more power supply rails; and coupling one or more controllers from a plurality of controllers to one or more bridges from the plurality of bridges. In one embodiment, the method further comprises converting voltage levels on the one or more power supply rails to their respective digital representations. In one embodiment, the method further comprises closing a control loop formed by the one or more bridges, external passive components, one of the ADCs of the plurality of ADCs, and one of the controllers of the plurality of controllers.

In one embodiment, each of the plurality of controllers includes a register. In one embodiment, each of the plurality of bridges includes a register. In one embodiment, the method further comprises storing a plurality of configurations to a NVM for coupling the plurality of bridges with the plurality of controllers. In one embodiment, the plurality of configurations includes one or more of: switching frequency for each of the plurality of bridges; compensation filter characteristics for each of the plurality of controllers; or coupling information for each controller and each bridge of the plurality of controllers and bridges.

In one embodiment, the method further comprises updating the plurality of configurations at power-up. In one embodiment, the method further comprises copying some of the configuration information from the NVM to the respective registers of the plurality of bridges and the plurality of controllers. In one embodiment, the method further comprises coupling a main controller to the plurality of controllers and the plurality of bridges by a configuration bus. In one embodiment, the method further comprises coupling each controller of the plurality of controllers and each bridge of the plurality of bridges by a communication fabric.

In one embodiment, the communication fabric is one of: an asynchronous bus, a crossbar, a network of wires, or dedicated connections with multiplexers. In one embodiment, the method further comprises configuring a single controller from the plurality of controllers to operate with more than two bridges of the plurality of bridges.

In another example, an apparatus is provided which comprises: means for driving by a plurality of bridges respective signals for one or more power supply rails; and means for coupling one or more controllers from a plurality of controllers to one or more bridges from the plurality of bridges.

In one embodiment, the apparatus further comprises means for converting voltage levels on the one or more power supply rails to their respective digital representations. In one embodiment, the apparatus further comprises means for closing a control loop formed by the one or more bridges, external passive components, one of the ADCs of the plurality of ADCs, and one of the controllers of the plurality of controllers. In one embodiment, each of the plurality of controllers includes a register. In one embodiment, each of the plurality of bridges includes a register.

In one embodiment, the apparatus further comprises means for storing a plurality of configurations to a NVM for coupling the plurality of bridges with the plurality of controllers. In one embodiment, the plurality of configurations includes one or more of: switching frequency for each of the plurality of bridges; compensation filter characteristics for each of the plurality of controllers; or coupling information for each controller and each bridge of the plurality of controllers and bridges.

In one embodiment, the apparatus further comprises means for updating the plurality of configurations at power-up. In one embodiment, the apparatus further comprises means for copying some of the configuration information from the NVM to the respective registers of the plurality of bridges and the plurality of controllers. In one embodiment, the apparatus further comprises means for coupling a main controller to the plurality of controllers and the plurality of bridges. In one embodiment, the apparatus further comprises means for coupling each controller of the plurality of controllers and each bridge of the plurality of bridges. In one embodiment, the means for coupling each controller of the plurality of controllers and each bridge of the plurality of bridges is one of: an asynchronous bus, a crossbar, a network of wires, or dedicated connections with multiplexers. In one embodiment, the apparatus further comprises means for configuring a single controller from the plurality of controllers to operate with more than two bridges of the plurality of bridges.

In another example, a system is provided which comprises: one or more power supply rails; one or more logic units coupled to the one or more power supply rails, the one or more power supply rails to provide power supply to the one or more logic units; and a power management integrated circuit (PMIC) coupled to the one or more power supply rails, the PMIC including an apparatus as described above.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An integrated circuit comprising:
    a plurality of bridges which are operable to drive respective signals for one or more power supply rails;
    a plurality of controllers;
    a main controller to couple one or more controllers from the plurality of controllers to one or more bridges from the plurality of bridges; and
    a non-volatile memory (NVM) coupled to the main controller, the NVM to store a plurality of configurations for coupling the plurality of bridges with the plurality of controllers, the plurality of configurations including one or more of:
    switching frequency for each of the plurality of bridges;
    compensation filter characteristics for each of the plurality of controllers; or
    coupling information for each controller and each bridge of the plurality of controllers and bridges.

2. The integrated circuit of claim 1 further comprises a plurality of analog-to-digital converters (ADCs) for converting voltage levels on the one or more power supply rails to their respective digital representations.

3. The integrated circuit of claim 2, wherein the plurality of ADCs is coupled to the plurality of controllers.

4. The integrated circuit of claim 2, wherein each of the plurality of controllers includes a digital compensator to close a control loop formed by the one or more bridges, external passive components, one of the ADCs of the plurality of ADCs, and one of the controllers of the plurality of controllers.

5. The integrated circuit of claim 1, wherein each of the plurality of controllers includes a register.

6. The integrated circuit of claim 4, wherein each of the plurality of bridges includes a register.

7. The integrated circuit of claim 1, wherein the NVM is operable to update the plurality of configurations at power-up.

8. The integrated circuit of claim 5, wherein the main controller is operable to copy some of the configuration information from the NVM to the respective registers of the plurality of bridges and the plurality of controllers.

9. The integrated circuit of claim 1, wherein the main controller is coupled to the plurality of controllers and the plurality of bridges by a configuration bus.

10. The integrated circuit of claim 9, wherein each controller of the plurality of controllers and each bridge of the plurality of bridges is coupled by a communication fabric.

11. The integrated circuit of claim 10, wherein the communication fabric is one of: an asynchronous bus, a crossbar, a network of wires, or dedicated connections with multiplexers.

12. The integrated circuit of claim 11, wherein each controller of the plurality of controller operates using a clock signal.

13. The integrated circuit of claim 1, wherein the main controller is operable to configure a single controller from the plurality of controllers to operate with more than two bridges of the plurality of bridges.

14. A system comprising:
    one or more power supply rails;
    one or more logic units coupled to the one or more power supply rails, the one or more power supply rails to provide power supply to the one or more logic units; and
    a power management integrated circuit (PMIC) coupled to the one or more power supply rails, the PMIC including:

a plurality of bridges which are operable to drive respective power supplies on the one or more power supply rails;
a plurality of controllers;
a main controller to couple one or more controllers from the plurality of controllers to one or more bridges from the plurality of bridges; and
a non-volatile memory (NVM) coupled to the main controller, the NVM to store a plurality of configurations for coupling the plurality of bridges with the plurality of controllers, the plurality of configurations including one or more of:
switching frequency for each of the plurality of bridges;
compensation filter characteristics for each of the plurality of controllers; or
coupling information for each controller and each bridge of the plurality of controllers and bridges.

15. The system of claim 14 further comprises a wireless interface for allowing the system to communicate with another device.

16. An integrated circuit comprising:
a main controller;
a register bus coupled to the main controller;
a plurality of bridges each having a register to receive configuration information from the register bus;
a plurality of controllers each having a register to receive the configuration information from the register bus; and
a non-volatile memory (NVM) coupled to the main controller, the NVM to store a plurality of configurations for coupling the plurality of bridges with the plurality of controllers, the plurality of configurations including one or more of:
switching frequency for each of the plurality of bridges;
compensation filter characteristics for each of the plurality of controllers; or
coupling information for each controller and each bridge of the plurality of controllers and bridges.

17. The integrated circuit of claim 16 further comprises:
an asynchronous bus coupled to the plurality of bridges and the plurality of controllers.

18. The integrated circuit of claim 16, wherein the main controller is operable to provide the configuration information over the register bus for the plurality of bridges and controllers.

19. The integrated circuit of claim 16 further comprises a plurality of analog-to-digital converters (ADCs) for converting voltage levels on the one or more power supply rails to their respective digital representations.

* * * * *